United States Patent [19]

MacMillan

[11] Patent Number: 5,088,147
[45] Date of Patent: Feb. 18, 1992

[54] ADJUSTABLE LENGTH HANDLE FOR FLAT FINISHERS

[75] Inventor: Donald M. MacMillan, Chilliwack, Canada

[73] Assignee: Concorde Tool Corp., Surrey, Canada

[21] Appl. No.: 588,055

[22] Filed: Sep. 24, 1990

Related U.S. Application Data

[63] Continuation-in-part of Ser. No. 390,969, Aug. 8, 1989, abandoned, which is a continuation-in-part of Ser. No. 228,048, Oct. 3, 1988, abandoned.

[51] Int. Cl.$^5$ .............................................. B05C 17/10
[52] U.S. Cl. ................................... 15/144 B; 15/235.4
[58] Field of Search ............... 15/143 B, 144 B, 235.3, 15/235.4, 235.5, 235.6, 235.7, 235.8; 294/19.1, 53.5; 156/574, 579; 425/458

[56] References Cited

U.S. PATENT DOCUMENTS

| | | | |
|---|---|---|---|
| 1,713,513 | 5/1929 | Abram | 15/235.8 |
| 1,741,004 | 12/1929 | Wornstaff | 294/53.5 |
| 1,795,991 | 3/1931 | Barwick | 294/53.5 |
| 2,934,937 | 5/1960 | Bennett | 15/235.8 |
| 3,090,984 | 5/1963 | Dunnigan | 15/235.4 |
| 3,105,262 | 10/1963 | Lathrop et al. | 15/235.7 |
| 3,146,481 | 9/1964 | Chiuchiarelli | 15/235.8 |
| 3,347,586 | 6/1967 | Sharp | 294/19.1 |
| 3,572,852 | 3/1971 | Seilaz | 294/53.5 X |
| 3,596,946 | 8/1971 | Burton et al. | 15/144 B X |
| 4,592,797 | 6/1986 | Carlson | 156/574 |

FOREIGN PATENT DOCUMENTS

| | | | |
|---|---|---|---|
| 1484872 | 5/1969 | Fed. Rep. of Germany | 294/53.5 |
| 109977 | 3/1944 | Sweden | 294/53.5 |

Primary Examiner—Henry J. Recla
Assistant Examiner—Robert M. Fetsuga
Attorney, Agent, or Firm—Robert W. Jenny

[57] ABSTRACT

The subject handle comprises basic structure in the form of two tubes, one telescoped into the other, fitted with mechanism to clamp them together at any adjusted length. The clamp mechanism is well known in the art, being used in tent poles, boat hooks and the like and is operable by rotating the tubes relative to each other. The handle further comprises mechanism for interconnecting a lever at one end with clamping mechanism at the other. This mechanism disengages during handle length adjustment and automatically engages once the length adjustment is made and locked and the interconnecting mechanism is operated.

4 Claims, 2 Drawing Sheets

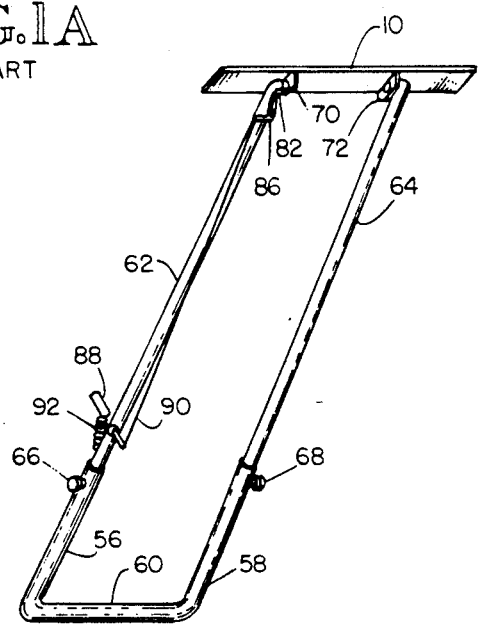
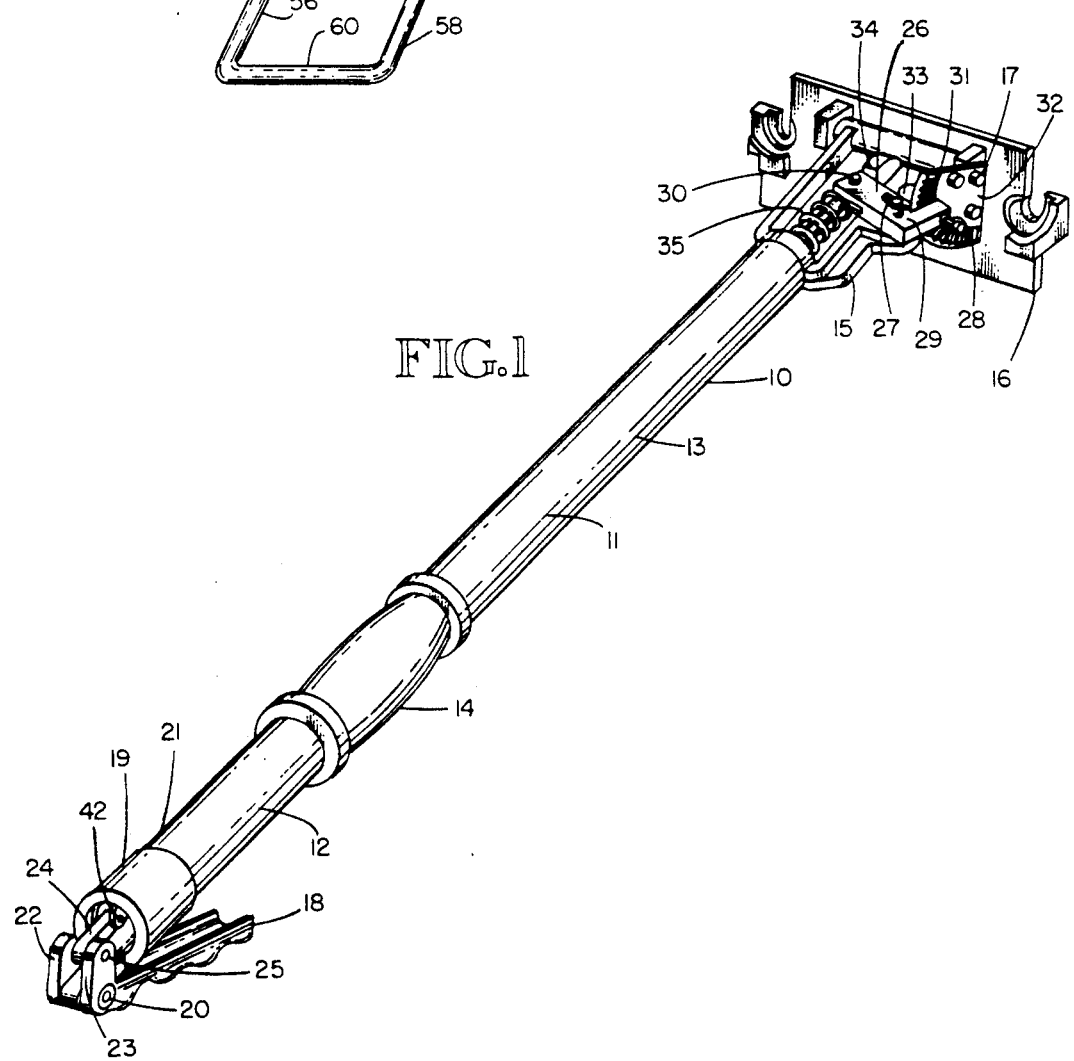

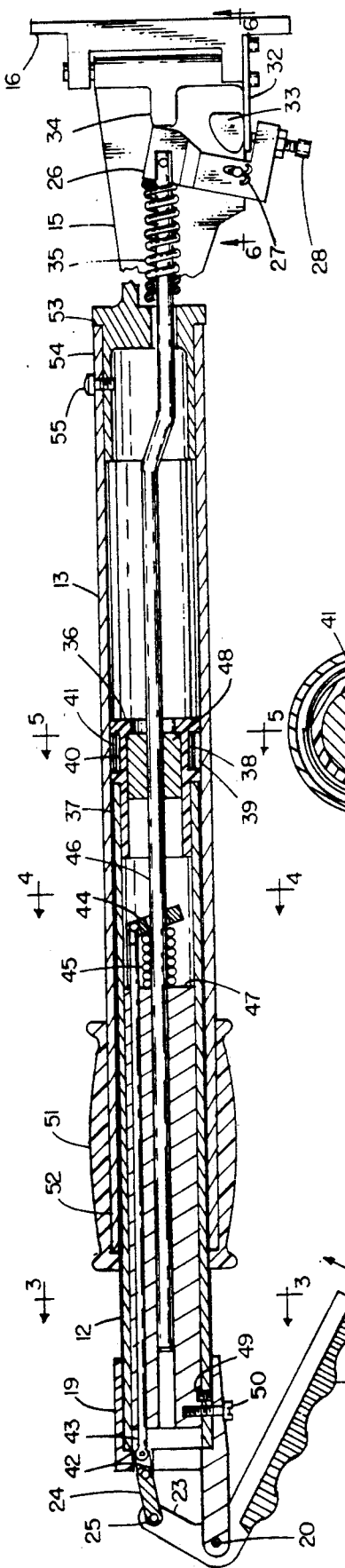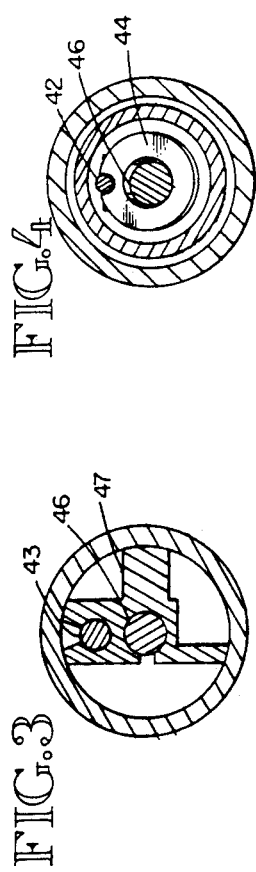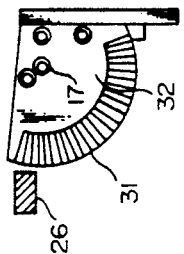

ADJUSTABLE LENGTH HANDLE FOR FLAT FINISHERS

This application is a continuation-in-part of application Ser. No. 390,969, filed Aug. 8, 1989 which is a continuation-in-part of application Ser. No. 228,048, filed Oct. 3, 1988, application Ser. No. 228,048 being abandoned and application Ser. No. 390,969 to be abandoned when this application is duly filed.

BACKGROUND OF THE INVENTION

1. Field

The subject invention is in the field of extendable/retractable apparatus such as tent poles, fishing rods and boat hooks which can be set at any length within a length range. More specifically it is in the field of such apparatus which incorporates mechanism by which one mechanism at one end of the apparatus operates and controls another mechanism at the other end of the apparatus. Still more specifically it is in the field of such apparatus and related mechanisms adapted for use with apparatus used in construction of dry walls in buildings, apparatus known in the trade as a flat finishing box, used in the crowning and finishing of taped joints between drywall panels.

2. Prior Art

The closet known prior art is shown in the patents listed below. These patents are: U.S. Pat. Nos. 2,934,937, 3,146,481, 3,105,262, 3,090,984, 4,592,797.

In the field of drywall construction and finishing, apparatus termed a flat finishing box is attached to a handle to enable the operator to apply the box to the joints being serviced by the box. To adapt the apparatus to various use situations various lengths of handles are needed to work with, for example, a variety of heights of ceilings and, also, the box must be set in a range of angles with respect to the long axis of the handle. The conventional apparatus comprises a fixed length handle with a lever at one end operable to lock the box pivoted at the other end of the handle at a specific angle to the handle axis. When a variety of lengths of handles is required, it is necessary either to have a number of flat finishing boxes, each attached to a specific length handle or to use fewer boxes than handle lengths required, (usually one box) and interchange the box or boxes from handle to handle in order to have the box on a handle of suitable length. The use of multiple boxes, each with a different length handle attached, is not generally acceptable because of the cost and because the compound used in the boxes sets up, i.e. hardens, so that compound in boxes not fully emptied in use is wasted and removal of the wasted compound is time consuming. The use of fewer boxes than handles is standard practice but changing the boxes from handle to handle is time consuming and tends to be awkward if the box contains the compound referred to in the trade as "mud".

Therefore, for flat finishing drywall joints more efficiently in terms of the inter-related factors of time and cost, there has been a longstanding need for a flat finishing tool with an adjustable length handle, particularly one adjustable to any length within a length range.

The apparatus shown in U.S. Pat. No. 3,090,984 issued to Dunnigan constitutes an earlier attempt to meet this need. The apparatus is shown in FIG. 1A which is FIG. 5 of Dunnigan's patent. This apparatus is considered to not adequately meet the need for at least two significant reasons. First, it does not resemble the conventional widely used and accepted handle used on flat finishers. The conventional handle is a single tube having the flat finishing box pivotally and lockably attached to one end and an operating lever at the other end, accessible to and usable by the operator of the finisher without significant repositioning of the hand grasping the lever end of the handle. Operating the lever locks the flat finishing box at a specific angle, in a range of angles, to the handle. Second, in the Dunnigan apparatus the operating lever 88, used for adjusting the angle of plate 10 to tubes 62 and 64, is attached to tube 62 so that the distance from lever 88 to part 86 and the related mechanism does not change when the length of the apparatus is adjusted by loosening thumb screws 66 and 68, moving tubes 62 and 64 telescopically in sections 56 and 58 respectively of tube 60 and retightening the thumb screws. This means that the distance of handle 88 from the operator changes each time the length of the apparatus is changed. This fact adds to the difficulty of using the apparatus resulting from not having the lever at the end of the handle. The angle adjustment mechanism does not change length with changes in length of the handle. Accordingly, the primary objective of the subject invention is to provide a handle, adjustable to any length within a length range. Other objectives are that the handle be adjustable quickly and easily, without significant repositioning of the user's hands and that the apparatus be reliable, durable and economical to manufacture.

SUMMARY OF THE INVENTION

The invention is an adjustable length handle for use with a flat finishing box as used in the trade for finishing joints between drywall panels.

The flat finishing box is attached to a bracket which in turn is pivotally attached to one end of the handle, the axis of the pivotal attachment being perpendicular to the longitudinal axis of the handle according to conventional practice. A bell crank lever is pivotally attached to the other end of the handle. The bracket is fitted with an arcuate sector and pivoted to a fixture equipped with clamping mechanism. The bell crank lever and clamping mechanism are mechanically interconnected by apparatus described below. In use the box is set at the desired angle relative to the handle by holding the box against the work surface and then the bell crank lever is actuated to cause the clamping mechanism to clamp the arcuate segment, thus locking the box at the set angle relative to the handle.

The handle comprises two tubes, one telescoped into the other. The handle length is changed by sliding one tube relative to the other and the length is set by twisting the tubes to actuate a mechanism which frictionally locks the tubes together to maintain the length as adjusted. This locking mechanism is attached to the end of the smaller of the two tubes, the end inside the larger tube. This frictional locking mechanism is well known in the art, comprising helical cams which, when moved circumferentially relative to each other in one direction, interact to expand the outside diameter of the outer cam and contract the diameter of the inner cam to provide the frictional lock. Twisting the tubes in the other direction allows the cams to relax and unlock the tubes relative to each other.

The apparatus interconnecting the bell crank lever and the clamping mechanism comprises two rods, a locking washer and a spring. One rod is connected to the clamping mechanism and the other at one of its ends to the lever by double links and to the rim of the washer at its other by a pivot pin. They are installed lengthwise in holes in an extruded part fitted inside the smaller tube and held parallel to each other and a distance apart. The locking washer is installed on the rod attached to the clamping mechanism and has a hole at its center of a diameter such that when the washer is essentially perpendicular to the rod the rod slides freely through the hole but when the washer is cocked slightly the corners between the hole and the flat sides of the washer bite into the rod and prevent motion of the rod through the hole. In use, when the bell crank lever is not actuated, the spring, installed on the rod attached to the clamping mechanism between the extruded part and the washer, positions the washer generally perpendicular to the clamping mechanism rod so that when the handle length is changed the clamping mechanism rod slides through the washer hole and the lever and clamping mechanism are disconnected. When the handle-length is set and locked and the bell crank lever actuated, the lever and linkage are such that the rod connected to the lever is moved to pull on its pivoted connection to the rim of the washer. Motion of this rod first cocks the washer, locking it to the clamping mechanism rod and then moves the washer, clamping mechanism rod and clamping mechanism to lock the bracket and box at the set angle relative to the handle axis. It is considered to be understandable from this description that (1) while the handle tubes are not locked to each other the bell crank lever and clamping mechanism are disconnected and the handle length can be adjusted without affecting the clamping mechanism and (2) once the handle length is adjusted and the tubes frictionally locked to each other, operation of the lever first locks the bell crank lever to the clamping mechanism and then operates the clamping mechanism. Releasing the bell crank lever allows the spring to unlock the washer from the clamping mechanism rod, thus unlocking the lever from the clamping mechanism and allowing for handle length adjustment if desired. The locking apparatus changes length when handle length is adjusted.

The invention is described in more detail below with reference to the attached drawings.

BRIEF DESCRIPTION OF THE DRAWINGS

FIG. 1 is a perspective view of a schematic representation of the invention.

FIG. 1A is FIG. 5 from U.S. Pat. No. 3,090,984, issued to Dunnigan.

FIG. 2 is a sectional view of the invention at a plane through the longitudinal axis and perpendicular to the axis of the pivot pin of the hand lever. Note: In this view the apparatus beyond the break at the right end of the view is rotated 90 degrees to simplify the detailed description.

FIG. 3 is a sectional view taken at 3—3 in FIG. 2.
FIG. 4 is a sectional view taken at 4—4 in FIG. 2.
FIG. 5 is a section taken at 5—5 in FIG. 2.
FIG. 6 is a section taken at 6—6 in FIG. 2.

DETAILED DESCRIPTION OF THE INVENTION

The invention is an adjustable length handle for use with a flat finishing box used in finishing joints between drywall panels. In such tools the box is attached to a bracket which is pivotally connected at one end of the handle so that the box can move through an angle range of approximately 90 degrees with respect to the handle. At the other end of the handle there is a hand grippable lever. The lever and bracket are mechanically interconnected so that operating the lever locks the bracket and box at a particular angle in the 90 degree range. The angle is set when the operator holds the box against a work surface with the handle. In current practice variations in distances between the operator and work surfaces are accommodated by using a variety of handles of different lengths. With the subject invention the variation in distances is accommodated by adjustment of the length of the handle. This requires first means for adjusting the length of the handle structure and second means for adjusting the length of the mechanical linkage between the lever and bracket with changes in length of the handle structure. Such second means for adapting are not used in Dunnigan, with resulting disadvantages including those noted above.

FIG. 1 is a non-proportional, perspective view of one embodiment 10 of the invention. Handle 11 comprises tubes 12 and 13, tube 12 being telescopically inserted into tube 13. Grip 14 is fitted onto one end of the tube 13. Fixture 15 is attached to the other end. Bracket 16 is pivotally attached to the fixture by pin 17. Operating lever 18 is pivotally connected to fixture 19 by pin 20 and fixture 19 is attached to end 21 of tube 12. Arms 22 and 23 of the lever are pinned to link 24 by pin 25. Link 24 is mechanically connected to lever 26 which is pivoted on bracket 15 on pin 27. This mechanical linkage is explained in detail below with reference to FIGS. 2, 4 and 5.

It allows changing the length of the handle while the user's hand remains in contact with operating lever 18. In the Dunnigan apparatus, FIG. 1A, operating lever 88 is connected to lever 86 by link 90. End 82 of lever 86 engages one of a plurality of holes in bracket 70 to set plate 10 at one angle in a range of angles to tube 62. To change the length of Dunnigan's handle assembly thumb screws 66 and 68 are loosened and tubes 62 and 64 are telescopically adjusted in sections 56 and 58 of U shaped portion 60. The locking apparatus (levers 88 and 86 and link 90) does not change length when the handle assembly length is adjusted. It can be understood from this description that both the user's hands are needed to change the handle length, requiring removal of the hand operating lever 88 from lever 88. Also, when the length is adjusted, the distance of lever 88 from the user is also adjusted (changed) with access to it becoming more difficult for longer lengths.

Referring again to FIG. 1, screw 28 in arm 29 of lever 26 is pointed at its end not visible in this view. When a tension force is applied at pin 30 in lever 26, the screw point is pressed into whichever one of the serrations 31 on sector 32 is opposite the screw point. Sector 32 is attached to bracket 16 and the engagement of the screw point in a serration fixes the angle set between the bracket and fixture 15. Protuberance 33 on the fixture backs the sector against the force applied by the screw point. Protuberance 34 limits the travel of lever 26 produced by the force of spring 35 and therefore the travel of the screw point away from the sector.

The apparatus is shown in more detail in FIG. 2, a sectional view in a plane through the longitudinal centerline of the handle and perpendicular to the axis of pin 20. In FIG. 2, the portion beyond the break near the right hand end of the view is rotated 90 degrees relative to its orientation as shown in FIG. 1, to simplify the description. Parts numbered with reference to FIG. 1 are similarly numbered in FIGS. 2-6 as necessary for purposes of the description.

Referring to FIG. 2, tube 12 is shown telescopically inserted into tube 13 with fitting 36 fastened into its end 37. Spiral cams 38 and 39, also seen in FIG. 5, a sectional view taken at 5—5 in FIG. 2, are fitted into groove 40 in fitting 37. There is a metallic layer 41 between the mating surfaces of the cams. Camming mechanism as shown is well known in the art and functions as follows. When tube 12 is rotated in the direction indicated by arrow A in FIG. 5, friction between tube 12 and cam 38 turns cam 38 so that its spiral surface cams against the mating, foil lined spiral surface of cam 39. Cam 39 is kept from rotating inside tube 13 by friction between it and the tube. The relative motion between the cams causes their effective inside diameter to tend to decrease and their effective outside diameter to tend to increase. This results in frictional forces which effectively lock tube 12 to tube 13 by clamping action, preventing longitudinal motion between them. Turning tube 12 in the direction opposite to that indicated by arrow A reduces and then eliminates the locking action. Therefore it can be understood that the length of the handle can be adjusted by rotating tube 12 relative to tube 13 to eliminate the locking action, sliding tube 12 in tube 13 to vary the amount of insertion within a range of insertion to produce the desired length and then turning tube 12 relative to tube 13 to lock the tubes to set the desired length.

The mechanism which interconnects lever 18 and bracket 16 and allows changes in length of the interconnection mechanism with changes in length of the handle comprises lever 18, link 24, link(s) 42, rod 43 locking washer 44, spring 45, rod 46, spring 35, lever 26, screw 28, sector 32, and protuberances 33 and 34. These parts are pivotally connected by pins as shown.

Rods 43 and 46 are supported and guided in extruded part 47, shown in section in FIG. 3, a section taken at 3—3 in FIG. 2. Also, bushing 48 in fitting 36 supports rod 46. Part 47 slides into tube 12 and is held in position by screws 49 and 50, (FIG. 2), screw 50 also holding fitting 19 to tube 12.

Elastomeric grip 51 is frictionally retained on end 52 of tube 13. Grip 51 and operating lever 18 aid in rotating the tubes relative to each other as required for adjusting the handle length.

The mechanical interconnection between lever 18 and bracket 16 operates as follows. When operating lever 18 is not being operated and the mechanism is in its at-rest condition spring 35 pushes against fitting 53, held in end 54 of tube 13 by screw 55, and against lever 26, holding it against protuberance 34 and holding screw 28 out of engagement with sector 32. When lever 18 is operated by moving it in the direction indicated by arrow B, arm(s) 23, link 24, and link 42, as pivotally connected and installed, move rod 43 toward the lever end of the handle. This rod motion initially rocks washer 44 on the end of spring 45 and causes it to lock onto rod 46, this type of locking action being well known in the art and used in commercially available items such as pipe clamps, for example. Once rod 43 is locked to rod 46, continued motion of lever 18 then moves rod 46 to rock lever 26 about pin 27, compressing spring 35, moving lever 26 away from protuberance 34 and causing screw 28 to engage one of the serrations 31 in sector 32, pressing the sector against protuberance 33 and thus locking bracket 16 in position relative to fixture 15. The configuration of the sector is shown more clearly in FIG. 6, a section taken at 6—6 in FIG. 2. When lever 18 is released, spring 45 returns it and the parts attached to it, including washer 44, to their at-rest positions, thereby unlocking rod 43 from rod 46 so that handle length can be adjusted if desired without restriction by the interconnecting linkage. Nevertheless, the interconnecting mechanism is ready to function as needed whenever the handle length has been adjusted and the handle is locked at the adjusted length. The engagement and disengagement of the mechanical interconnection between the operating lever and the locking mechanism is thus automatic.

It is considered to be evident from the above descriptions that the invention meets its objectives. It provides an adjustable length handle for use with flat finishers. The handle is adjustable easily and quickly, requiring only twisting the two handle parts and adjusting them telescopically relative to each other to effect handle length adjustment. The user's hands remain in place during the adjustment. The invention has been proven to be reliable, durable and economical to manufacture.

It is also believed to be understandable that while one embodiment of the invention is described herein, other embodiments and modifications of the one described are possible within the scope of the invention which is limited only by the attached claims.

I claim:

1. A handle for a pivotable flat finisher, said handle comprising:
    first and second tubes, said first tube being inserted telescopically into said second tube with the amount of insertion adjustable within a range of insertion,
    said first and second tubes defining an adjustable first length of said handle, one of said tubes having a lever mounted on a free end portion thereof, and the other of said tubes having a locking mechanism mounted on a free end portion thereof and adapted to lock said flat finisher in a selected position,
    means for locking said first tube to said second tube at any of various amounts of insertion within said range of insertion and
    means for mechanically interconnecting said operating lever and said locking mechanism, said means for mechanically interconnecting having an adjustable second length,
said second length being automatically adjusted when said first length is adjusted.

2. The apparatus of claim 1 in which said locking mechanism at said second end comprises clamping apparatus.

3. The apparatus of claim 1 in which said means for locking comprises clamping apparatus.

4. The apparatus of claim 2 in which said means for locking comprises clamping apparatus.

* * * * *